United States Patent [19]

Omura

[11] Patent Number: 5,184,845
[45] Date of Patent: Feb. 9, 1993

[54] AIR-BAG SYSTEM

[75] Inventor: Hideo Omura, Yokosuka, Japan

[73] Assignee: Nissan Motor Co., Ltd., Yokohama, Japan

[21] Appl. No.: 652,488

[22] Filed: Feb. 8, 1991

Related U.S. Application Data

[63] Continuation of Ser. No. 354,164, May 19, 1989, abandoned.

[30] Foreign Application Priority Data

May 20, 1988 [JP] Japan .................. 63-65845[U]
Feb. 17, 1989 [JP] Japan ...................... 1-38040

[51] Int. Cl.⁵ ............................................. B60R 21/28
[52] U.S. Cl. ................................... 280/735; 307/10.1; 280/739
[58] Field of Search ........................... 280/734–742, 280/730, 228; 180/268, 282; 307/10.1; 102/530; 340/425.5, 438

[56] References Cited

U.S. PATENT DOCUMENTS

| | | | |
|---|---|---|---|
| 3,511,519 | 5/1970 | Martin | 280/739 |
| 3,527,475 | 9/1970 | Carey et al. | 280/739 |
| 3,723,205 | 3/1973 | Scheffee | 280/741 |
| 3,791,669 | 2/1974 | Hamilton | 280/738 |
| 3,854,491 | 12/1974 | Bryan et al. | 280/737 |
| 3,887,213 | 6/1975 | Goetz | 280/739 |
| 3,888,505 | 6/1975 | Shibamoto | 280/738 |
| 3,909,037 | 9/1975 | Stewart | 280/738 |
| 3,929,350 | 12/1975 | Pech | 280/738 |
| 3,966,228 | 6/1976 | Neuman | 280/737 |
| 4,136,894 | 1/1979 | Ono et al. | 280/741 |
| 4,148,503 | 4/1979 | Shiratori et al. | 280/731 |
| 4,358,998 | 11/1982 | Schneiter et al. | 102/530 |
| 4,833,996 | 5/1989 | Hayashi et al. | 102/530 |

FOREIGN PATENT DOCUMENTS

49-72839 7/1974 Japan .
61-117051 7/1986 Japan .

Primary Examiner—Karin L. Tyson
Attorney, Agent, or Firm—Pennie & Edmonds

[57] ABSTRACT

An inflator is connected to an air-bag proper for inflating the same upon electric energization thereof. The inflator and the air-bag proper are so connected and designed as to make a rapid pressure reduction in the air-bag proper just after a rapid increase of the pressure, due to the force of inertia of the expanding air-bag proper. A control device is used for controlling, after the rapid increase of the pressure in the air-bag proper, the pressure in a manner to reduce a shock which is produced when a passenger collides against the inflated air-bag proper.

10 Claims, 8 Drawing Sheets

AIR-BAG SYSTEM

This is a continuation of application Ser. No. 07/354,164, filed May 19, 1989 now abandoned.

BACKGROUND OF THE INVENTION

1. Field of the Invention

The present invention relates in general to a safety system of a passenger motor vehicle, and more particularly to an air-bag system mounted in the motor vehicle for protecting a passenger upon a vehicle collision or the like.

2. Description of the Prior Art

Hitherto, various types of air-bag systems have been proposed and put into practical use in the field of motor vehicles.

Figure 12:
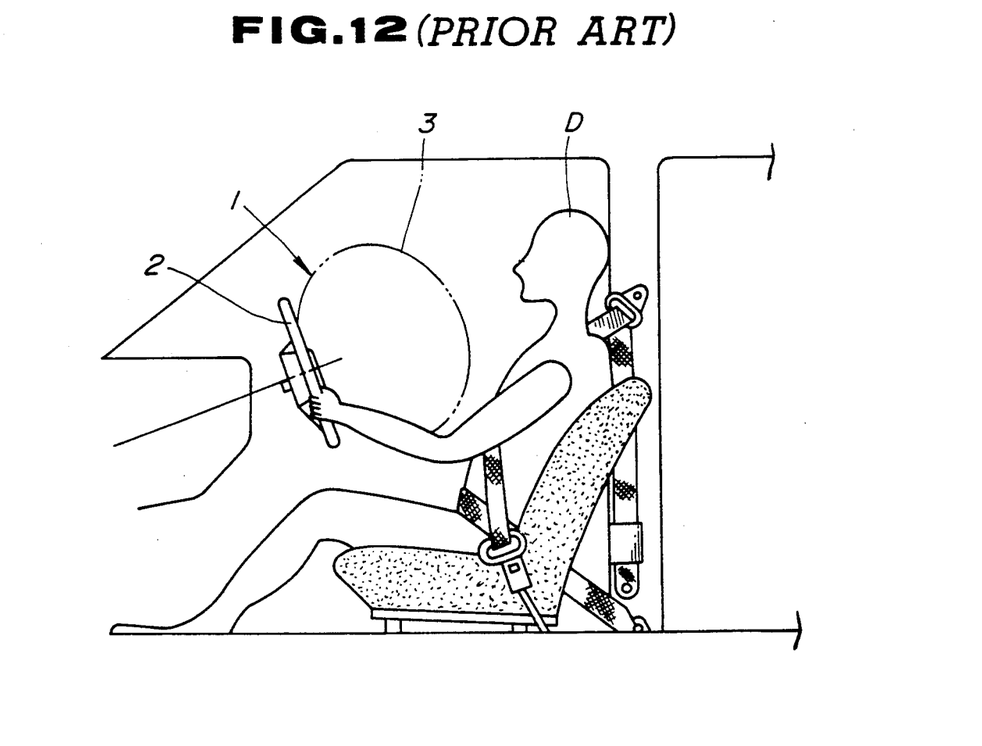
FIG. 12 is a schematic illustration of a passenger motor vehicle in which a conventional air-bag system is mounted.

In order to clarify the task of the present invention, one of the conventional air-bag systems will be outlined with reference to FIG. 12 of the accompanying drawings.

As is shown in the drawing, the air-bag system 1 comprises an air-bag proper 3 which is folded up and mounted on a steering wheel 2. An inflator (no numeral) is also mounted on the steering wheel 2 having gas discharging openings exposed to the interior of the air-bag proper 3. Upon a vehicle collision, a deceleration sensor (not shown) issues a signal to operate the inflator. Thus, the inflator generates gas thereby to instantly inflate the air-bag proper 3 as is illustrated by a phantom line in the drawing. With this, the upper half of the driver is safely protected from being directly abutting against the rigid steering wheel 2 or windshield. Although not shown in the drawing, a relief valve is connected to the inflator, which functions to release part of the gas in the air-bag proper when, due to collision of the driver against the inflated air-bag proper, the pressure in the air-bag proper 3 exceeds a given degree. With this gas releasing, shock applied to the driver by the air-bag proper 3 is lightened. Some of the air-bag systems of this type are shown in Japanese Patent First Provisional Publication No. 47-72839 and Japanese Utility Model First Provisional Publication No. 61-117051.

Although the above-mentioned air-bag systems have provided some protection to passengers, the air-bag systems have in the past been unable to provide optimum passenger protection under vehicle collision conditions to passengers with vastly different physical features.

Furthermore, due to the force of inertia of an expanding air-bag proper, undesired rapid pressure drop tends to occur just after a rapid pressure increase upon inflation of the bag. This pressure drop delays the time at which the air-bag proper is inflated to a degree suitable for assuredly protecting the passenger.

SUMMARY OF THE INVENTION

It is therefore an object of the present invention to provide a compact air-bag system which is free of the above-mentioned drawbacks.

According to the present invention, there is provided an air-bag system which exhibits a satisfied protecting function to every physical types of passengers.

According to the present invention, there is provided an air-bag system for a motor vehicle in which the passenger restricting characteristic of the air-bag proper is automatically adjusted in accordance with the physical features of the passenger and the degree of the vehicle collision.

According to the present invention, there is further provided an air-bag system for a motor vehicle in which a rapid pressure reduction in the air-bag proper which would occur just after a rapid pressure increase upon inflation of the air-bag proper is lessened.

According to a preferred embodiment of the present invention, an air-bag system for a motor vehicle comprises a container; an expandable air-bag proper contained in the container, the container being broken upon inflation of the air-bag proper; inflator means for inflating the air-bag proper upon electric energization thereof in response to an application of an abnormal shock to the vehicle, wherein upon inflation of the air-bag proper by the inflator means, the pressure in the air-bag proper being immediately reduced due to the force of inertia of the expanding air-bag proper; and pressure control means for controlling the pressure in the air-bag proper after the sudden pressure reduction to retain the pressure in the air-bag proper at a predetermined level to control the pressure in the air-bag proper after sudden increase of the pressure in the air-bag proper caused by an occupant colliding the air-bag proper to reduce impact to the occupant, wherein the pressure control means includes; a first relief valve for communicating the interior of the air-bag proper with the atmosphere when the internal pressure of the air-bag proper reaches a first given pressure; a second relief valve for communicating the interior of the air-bag proper with the atmosphere when the internal pressure of the air-bag proper reaches a second given pressure, the given pressure being higher than the first given pressure; sensor means for issuing information signals representative of the condition of the vehicle at the time when a vehicle collision occurs; and a control unit for controlling the characteristics of the first and second relief valves in accordance with the information signal from the sensor means.

BRIEF DESCRIPTION OF THE DRAWINGS

Other objects and advantages of the present invention will become apparent from the following description when taken in conjunction with the accompanying drawings, in which:

FIGS. 1 to 7 are drawings showing an air-bag system of a first embodiment of the present invention, in which:

FIGS. 8 and 9 are drawings showing an air-bag system of a second embodiment of the present invention, in which:

DETAILED DESCRIPTION OF THE INVENTION

Referring to FIGS. 1 to 7 of the accompanying drawings, there is shown an air-bag system 1 of a first embodiment according to the present invention.

Figure 1:
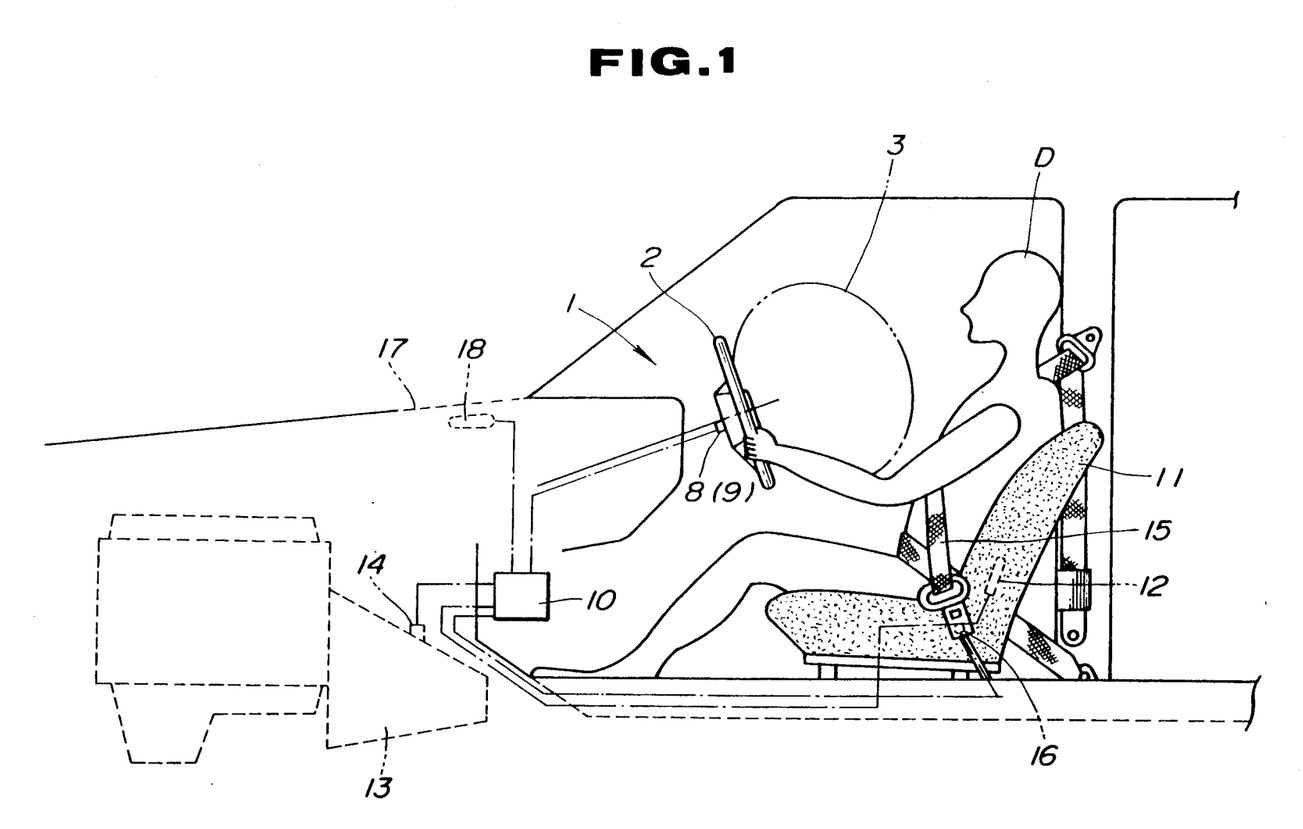
FIG. 1 is a schematic illustration of a passenger motor vehicle in which the air-bag system of the first embodiment is practically mounted.

As is shown in FIG. 1, the air-bag system 1 comprises an air-bag device which is mounted on a center of a steering wheel 2. As is seen from FIG. 2, the air-bag device comprises a base plate 5 which is secured to the steering wheel 2, a breakable container 7 which is held by the base plate 5, an air-bag proper 3 which is folded up in the container 7 having a mouth portion secured to the base plate 5 through retainers 6, an inflator 4 (or gas generator) which is held by the base plate 5 and has gas discharging openings exposed to the interior of the folded air-bag proper 3, and first and second electrically actuated relief valves 8 and 9 which are mounted to the base plate 5.

Figure 2:
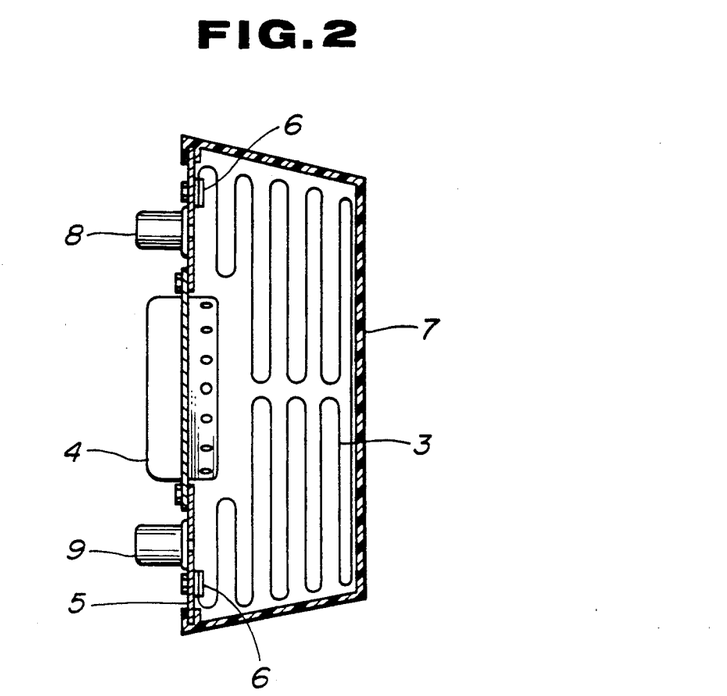
FIG. 2 is a sectional view of an air-bag device which constitutes part of the air-bag system.

The first relief valve 8 functions to open when, upon inflation of the air-bag proper 3, the internal pressure of the air-bag proper 3 increases to a first given pressure "$P_a$", so that upon a vehicle collision the passenger collides against the air-bag proper 3 of such first given internal pressure "$P_a$".

The second relief valve 9 functions to open when, due to collision of the passenger against the inflated air-bag proper 3, the internal pressure of the air-bag proper 3 increases to a second given pressure "$P_b$", so that the passenger is restrained by the air-bag proper 3 of such second given internal pressure "$P_b$".

It is to be noted that the critical pressure of each relief valve 8 or 9 can be changed by electric instruction signals applied thereto.

For controlling the first and second relief valves 8 and 9, a microprocessor 10 is employed, which receives information signals from a load sensor 12 which is mounted in a seatback 11 to sense the weight of a seat occupant "D", a vehicle speed sensor 14 which is mounted in a transmission 13, a seat belt sensor 16 which is mounted to a buckle portion of a seat belt 15, an atmospheric pressure sensor 18 which is arranged near an air inlet opening 17 of an engine room hood and a vehicle deceleration sensor (not shown) which detects a vehicle collision.

More specifically, the load sensor 12 detects the weight of an upper half of the seat occupant "D", while the vehicle speed sensor 14 and the seat belt sensor 16 function to detect the speed at which the seat occupant collides against the inflated air-bag proper 23. When the seat occupant does not use the seatbelt 15, the air-bag collision speed of the seat occupant is substantially equal to the speed of the vehicle with which the vehicle collision occurs. However, when the seat occupant uses the seatbelt 15, the air-bag collision speed of the seat occupant is somewhat reduced by a degree corresponding to the restriction by the seatbelt 15.

Atmospheric pressure which affects operation of the first and second relief valves 8 and 9 is variable from place to place. The atmospheric pressure is thus detected by the atmospheric pressure sensor 18 as one information factor for controlling the relief valves 8 and 9. However, if desired, the atmospheric pressure sensor may be omitted in the present invention.

In the following, description will be directed to a method as to how to determine the first given pressure "$P_a$".

When, due to a vehicle collision or the like, the passenger "D" collides against the inflated air-bag proper 3 and thus compresses the same, the volume reduction amount "$\Delta V$" in a very small period of time "$\Delta t$" is represented by the following equation:

$$\Delta V = -A \cdot v \cdot \Delta t \quad (1)$$

wherein:
- A: contact area between passenger and air-bag proper,
- v: speed at which passenger collides against air-bag proper.

Furthermore, since the force (viz., $m \cdot d^2S/dt^2$, wherein "m" is weight of the upper half of seat occupant and "S" is a moved distance by which seat occupant moves forward) which is applied to the air-bag proper 3 by the passenger D upon a vehicle collision is equal to the counterforce (viz., $(P-Pc) \cdot A$, wherein P is internal pressure of air-bag proper, and Pc is the atmospheric pressure) which is applied to the passenger "D" by the air-bag proper 3 throughout the time for which the passenger "D" is restrained by the air-bag proper 3, the following equation is obtained:

$$m \cdot (d^2S/dt^2) = -(P-Pc) \cdot A \quad (2)$$

From the two equations (1) and (2), the following equation is obtained.

$$d^2V/dt^2 = (P-Pc) \cdot A^2/m \quad (3)$$

The reduction amount "$\Delta Pe$" of the internal pressure in the air-bag proper 3 within a very small time "$\Delta t$" due to gas draining is represented by:

$$\Delta Pe = c \cdot \Delta t \quad (4),$$

and thus the internal pressure "P" in the air-bag proper 3 at the time when a time "$\Delta t$" has elapsed from the time "t" with no gas draining from the air-bag proper is represented by:

$$p = Po - \Delta Pe \quad (5),$$

wherein:
- Po: internal pressure at the time "t".

If there is no gas draining from the air-bag proper 3 throughout the time when the air-bag proper is being compressed by the passenger, the following equation is established:

$$P \cdot V = P_0 \cdot V_0 \qquad (6).$$

wherein:

$V_0$: volume of air-bag proper at the time "t",

V: volume of air-bag proper at the time when a time "Δt" has passed from the time "t".

From the equations (4), (5) and (6), the following equation is obtained:

$$dP/dt = -(P/V) \cdot (dV/dt) - c \qquad (7),$$

By using the differential equations (3) and (7), the deceleration of the passenger "D" (viz., seat occupant) is obtained.

Figure 3:
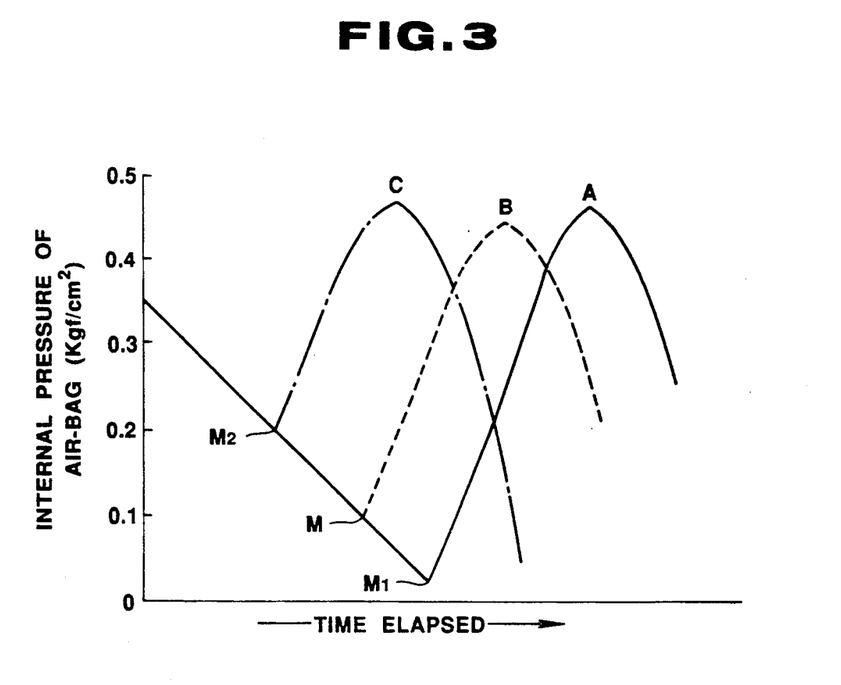
FIG. 3 is a graph showing the characteristic of an internal pressure of an air-bag proper with respect to time elapsed.
Figure 4:
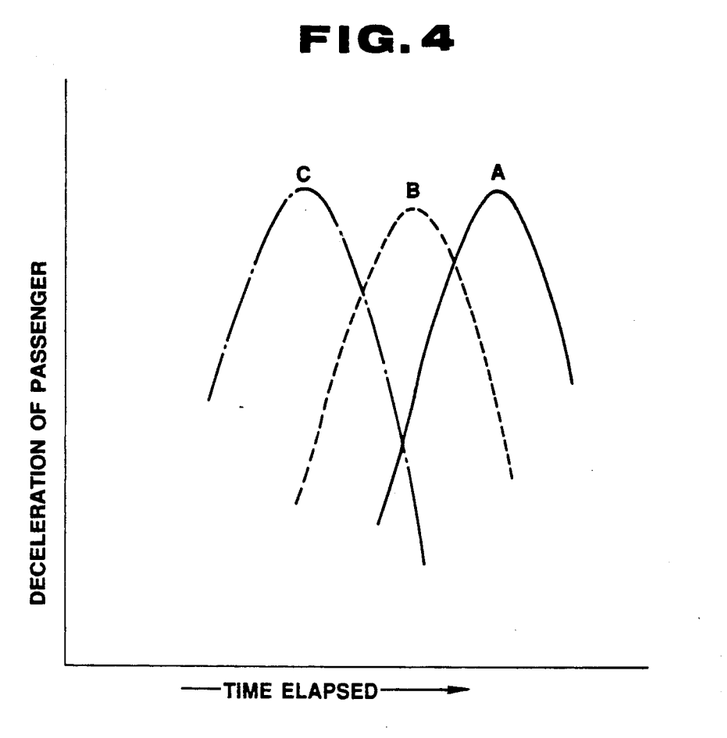
FIG. 4 is a graph showing the characteristic of the deceleration of a passenger protected by the inflated air-bag proper with respect to time elapsed.

FIG. 3 shows the characteristic of the internal pressure of the air-bag proper 3 when the passenger D collides against the same, in three modes wherein the initial internal pressure in the air-bag proper is varied, while, FIG. 4 shows the characteristic of the deceleration of the passenger D under such conditions.

That is, in FIG. 3, the references "$M_1$", "M" and "$M_2$" indicate the points at which the passenger D is brought into contact with the inflated air-bag proper 3. As is seen from this graph, the internal pressure of the air-bag proper 3 at the point "$M_1$", "M" or "$M_2$" increases in the order of the modes "A", "B" and "C".

As is seen from the graphs of FIGS. 3 and 4, when the collision of the passenger "D" against the air-bag proper 3 is effected with the point "M", the peaks of the internal pressure of the air-bag proper 3 and the passenger deceleration are the lowest.

Figure 5:
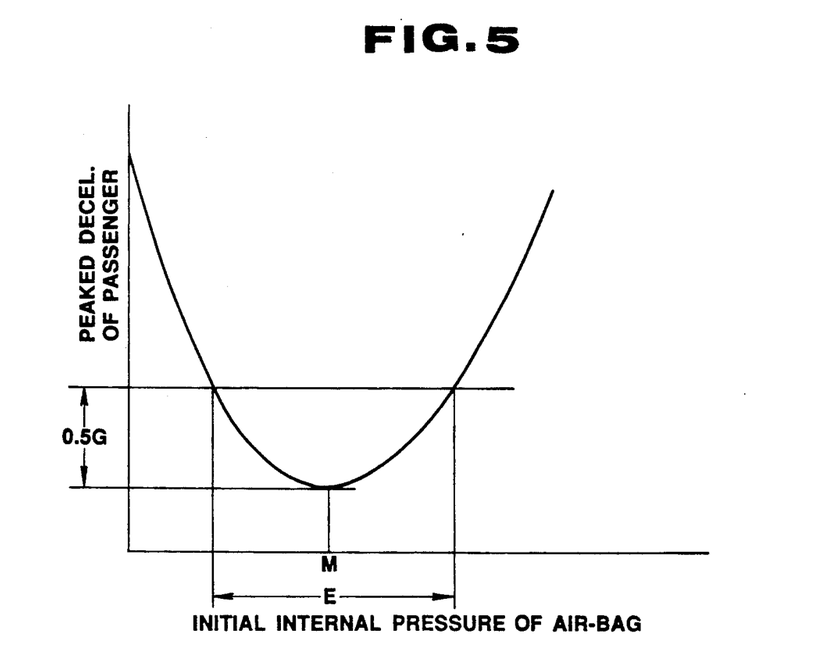
FIG. 5 is a graph showing a relationship between the internal pressure of the air-bag proper and the deceleration of the passenger at the time when the passenger collides against the air-bag proper.

FIG. 5 shows a relationship between the internal pressure of the air-bag proper 3 and the peaked passenger deceleration at the time when the passenger is restrained by the inflated air-bag proper 3. As is seen from this graph, the peaked deceleration "G" is largely affected by the internal pressure of the air-bag proper 3 at the time when the passenger D is brought into contact with the air-bag proper 3. That is, when the internal pressure is the value "M" (viz., 0.1 kg/m²), the peaked deceleration "G" is the lowest.

The reason why the peaked deceleration "G" is increased when the initial internal pressure of the air-bag proper 3 is smaller than the value "M" may be as follows:

Because, due to the decreased internal pressure, the air-bag proper 3 is softened, the contact area between the passenger D and the air-bag proper 3 is rapidly increased upon the collision of the passenger D against the air-bag proper 3. Furthermore, since the pressure changing rate of the air-bag proper 3 relative to the forwardly moved distance of the passenger D is increased, the counterforce of the passenger D, which is obtained from the product of the contact area and the internal pressure, is rapidly increased.

The reason why the peaked deceleration "G" is increased when the initial internal pressure of the air-bag proper 3 is larger than the value "M" may be as follows:

Because, under this condition, the air-bag proper 3 becomes rigid, the initial counterforce of the passenger is increased.

For the reasons as described hereinabove, if the initial internal pressure "$P_a$" is set at the value "M", the peaked deceleration "G" of the passenger is minimized. In practice, the initial internal pressure "Pa" is so set as to make the peaked deceleration within a range from the lowest value to a value larger than the lowest value by about 0.5 G. That is, the initial internal pressure "$P_a$" is within the range which is indicated by reference "E" in FIG. 5.

In the following, the method as to how to determine the second given pressure "$P_b$" will be described.

The kinetic energy of the passenger "D" just before the collision of the passenger D against the air-bag proper 3 is represented by $(m \cdot V^2/2)$, while, the energy absorbed by the air-bag proper 3 is represented by (F·l), wherein "F" is a counterforce applied from the air-bag proper 3 to the passenger D, and "l" is a moved distance of the air-bag proper 3. When the internal pressure of the air-bag proper 3 and the contact area are represented by "P" and "A", the counterforce "F" is represented by (P·A), and thus, the energy absorbed by the air-bag proper 3 is represented by (P·A·l).

In order to safety restrain the passenger D upon a vehicle collision, the energy absorbed by the air-bag proper 3 should be greater than the kinetic energy of the passenger D. Thus, the following equations should be satisfied.

$$m \cdot v^2/2 \leq P \cdot A \cdot l \qquad (8).$$

That is, $$P \geq m \cdot v^2 / 2 \cdot A \cdot l \qquad (9).$$

In order to reduce the passenger deceleration D upon the passenger being restrained by the air-bag proper 3, it is necessary to set the internal pressure "P" of the air-bag proper 3 as small as possible.

Accordingly, the second given pressure "$P_b$" should satisfy the following two equations in the same time:

$$P \geq m \cdot v^2 / 2 \cdot A \cdot \qquad (10).$$

$$P \approx m \cdot v^2 / 2 \cdot A \cdot l \qquad (11).$$

The calculation of the first and second given pressures "$P_a$" and "$P_b$" is carried out in the microprocessor 10.

Once the specification of the air-bag system 1 is established, the volume "V" of the air-bag proper 3, the contact area "A" between the air-bag proper 3 and the passenger "D" and the rate 37 c" at which the pressure in the air-bag proper 3 is reduced due to gas draining through the gas draining valve are automatically known.

While, the factors whose values are variable are the weight "m" of the upper half of the seat occupant D (viz., passenger), the speed "v" at which the passenger D collides against the air-bag proper 3, and the atmospheric pressure "$P_c$" which are sensed at the time when the associated motor vehicle is subjected to a vehicle collision.

With the fixed factors "V", "A" and "c" and the variable factors "m", "v" and "$P_c$", the first and second given pressures "$P_a$" and "$P_b$" are calculated in the microprocessor 10.

In the following, operation of the air-bag system 1 will be described.

When the deceleration sensor (not shown) senses a vehicle collision, the inflator 4 operates to inflate the air-bag proper 3. During this, the load sensor 14 mounted in the seatback 11 detects the weight "m" of the upper half of the seat occupant D, the vehicle speed sensor 14 in the transmission 13 detects the vehicle speed and the pressure sensor 18 detects the atmospheric pressure "$P_c$".

Figure 6:
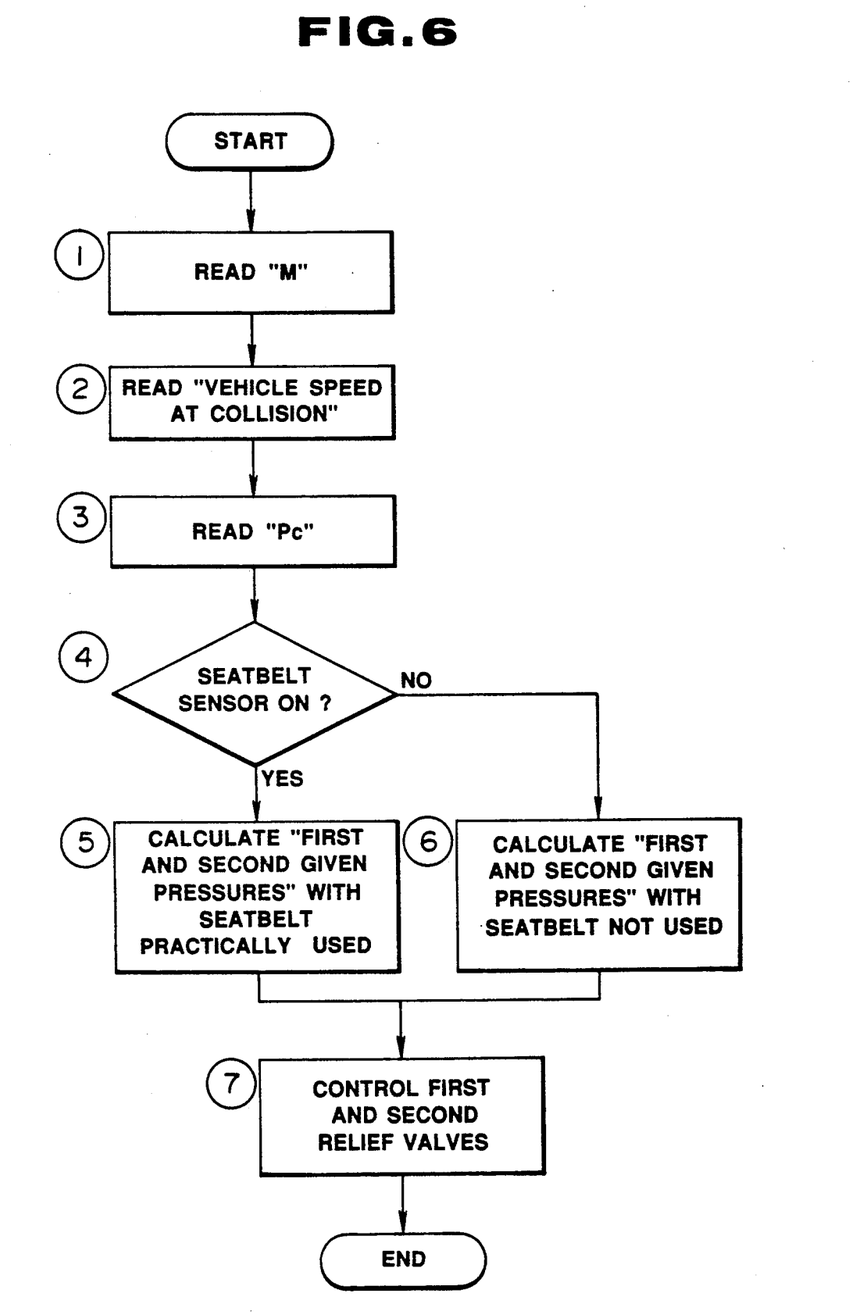
FIG. 6 is a flowchart showing the steps executed in a microprocesser employed in the first embodiment.

As is seen from the flowchart of FIG. 6, at steps 1, 2 and 3, the weight "m" of the upper half of the seat occupant D, the vehicle speed and the atmospheric pressure "$P_c$" are read respectively. Then, at step 4, a judgement as to whether the seatbelt sensor 16 is ON or not is carried out. When YES (viz., when the seatbelt 15 is practically used), the collision speed "v" of a seatbelt restrained passenger D against the air-bag proper 3 is calculated based on the vehicle speed and from the values "v" and "m", the first and second given pressures "$P_a$" and "$P_b$" are calculated, at step 5. When NO (viz., when the seatbelt 15 is not practically used), the vehicle speed is directly used as the collision speed "v" of the passenger D against the air-bag proper 3 and from the values "v" and "m", the first and second given pressures "$P_a$" and "$P_b$" are calculated, at step 6. At step 7, the first and second relief valves 8 and 9 are controlled in accordance with the results of the step 5 or 6. Thus, the first and second given pressures "$P_a$" and "$P_b$" are set at their optimum values.

Figure 7:
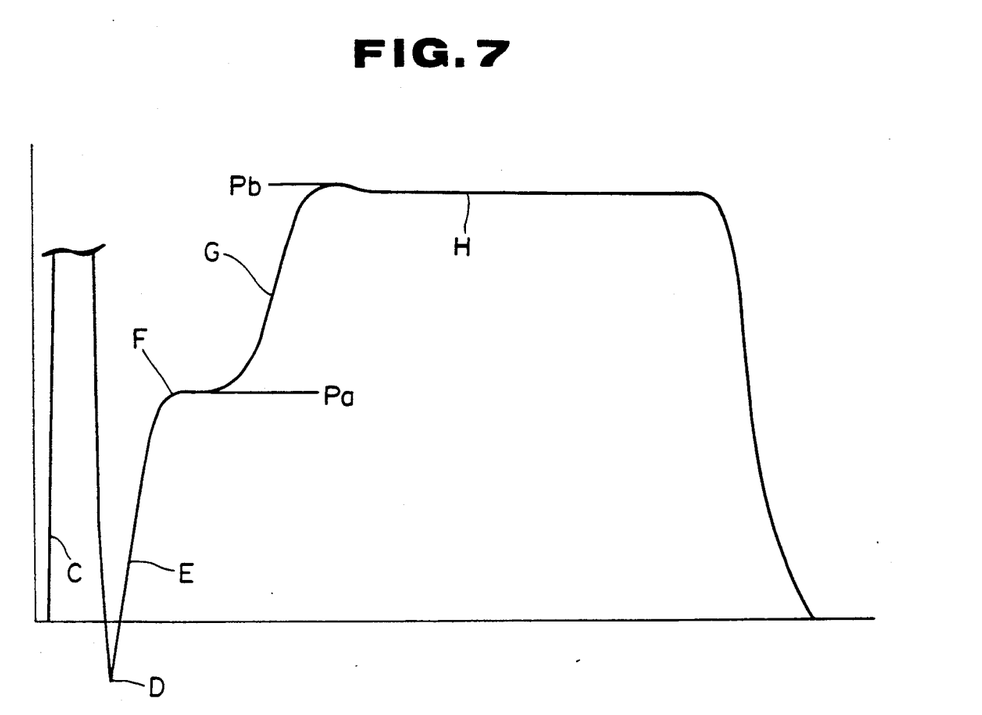
FIG. 7 is a graph showing the characteristic of the internal pressure of the air-bag proper when the vehicle is subjected to a vehicle collision.

FIG. 7 shows the characteristic of the internal pressure of the air-bag proper 3 upon a vehicle collision. Just after operation of the inflator 4, the internal pressure is rapidly increased as indicated by the curve "C". During this, the container 7 (see FIG. 2) is broken for making the air-bag proper 3 exposed to the outside. Because the rapid increase of the internal pressure causes an remarked force of inertia of the expanding movement of the air-bag proper 3, the internal pressure thereafter becomes negative but temporarily (see the portion "D"). Thereafter, the internal pressure is increased rapidly again (see the portion "E"). When the internal pressure reaches to the first given pressure "$P_a$", the first relief valve 8 is opened, so that thereafter the internal pressure is kept at the value "$P_a$" (see the portion "F"). When thereafter, the upper portion of the seat occupant "D" collides against the inflated air-bag proper 3, the internal pressure of the air-bag proper 3 is rapidly increased (see the portion "G"). When, thereafter, the internal pressure reaches to the second given pressure "$P_b$", the second relief valve 9 is opened, and thus thereafter, the internal pressure is kept at the value "$P_b$" (see the portion "H").

As is described hereinabove, since the internal pressure of the air-bag proper 3 at the time when the passenger "D" collides against the air-bag proper 3 is so set as to make the passenger peaked deceleration substantially minimized, the shock which would be applied from the air-bag proper 3 to the passenger D is minimized. Furthermore, after the time when the second relief valve 9 is open, the internal pressure of the air-bag proper 3 is kept at the value "$P_b$" which is the lowest value to protect the upper half of the seat occupant "D" from making direct collision against the rigid steering wheel 2. Thus, the counterforce applied to the passenger D from the air-bag proper 3 is minimized.

As is seen from the foregoing description, the internal pressure of the air-bag proper 3 is suitably controlled, so that the air-bag proper 3 can be made compact without sacrificing the function of the same.

Figure 8:
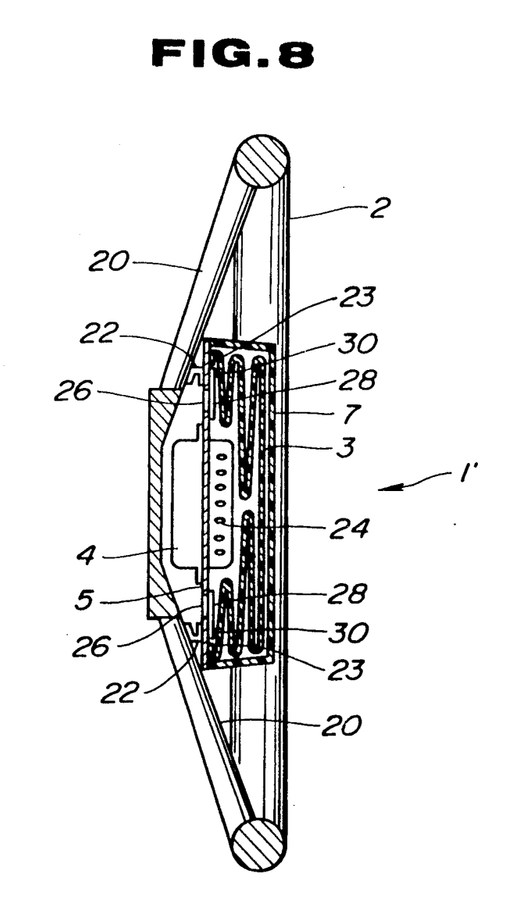
FIG. 8 is a sectional view of an air-bag device mounted on a steering wheel, which device constitutes part of the air-bag system of the second embodiment.
Figure 9:
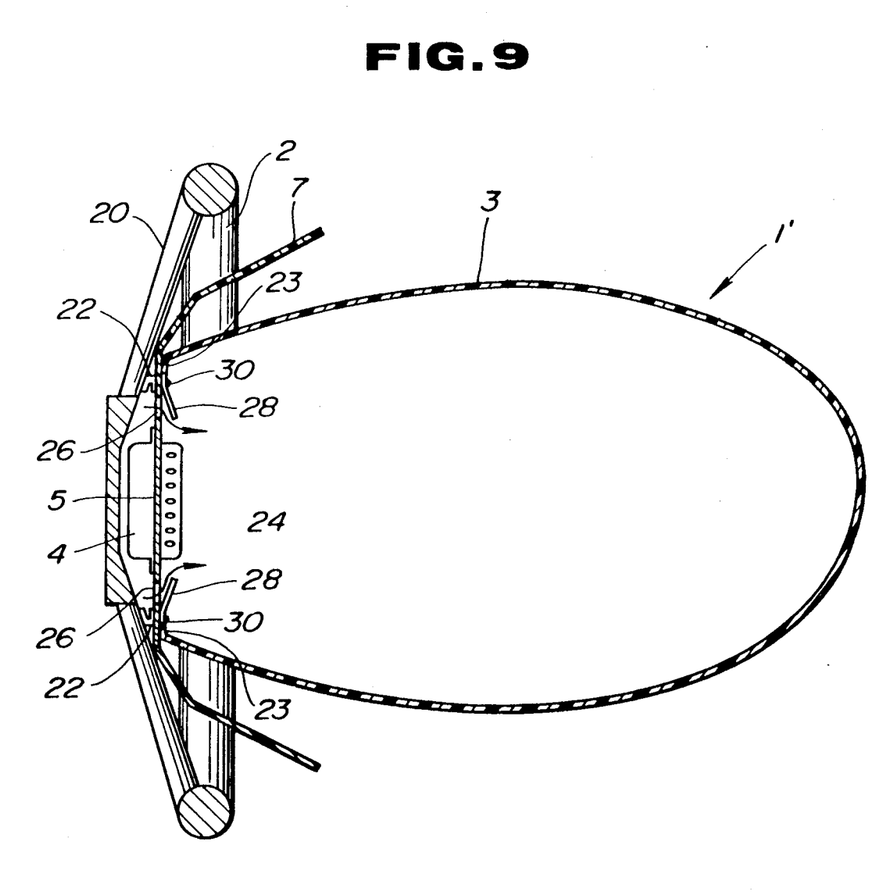
FIG. 9 is a view of the air-bag device of FIG. 8 under a condition wherein the air-bag proper is fully inflated.

Referring to FIGS. 8 and 9, there is shown an air-bag system 1' of a second embodiment of the present invention.

As is seen from FIG. 8, the air-bag system 1' of the second embodiment is mounted on a center of a steering wheel 2. The air-bag system 1' comprises a base plate 5 which is secured to spokes 20 of the steering wheel 2 through brackets 22. A breakable container 7 is fixed at its peripheral edge portion to the base plate 5. An air-bag proper 3 which is folded up is contained in the container 7. The mouth portion of the air-bag proper 3 is secured to the base plate 5 through retainers 23. An inflator 4 (or gas generator) is secured to the base plate and has gas discharging openings 24 exposed to the interior of the air-bag proper 3.

The base plate 5 is formed with a plurality of openings 26 which are arranged to surround the inflator 4. Each opening 26 is equipped with a reed member 28 which is pivotally connected at one end to a back surface of the base plate 5. Designated by numerals 30 are bolts for connecting the reed members 28 to the base plate 5. When, thus, the internal pressure of the air-bag proper 3 becomes less than the atmospheric pressure by a certain degree, the reed members 28 open the corresponding openings 26 thereby feeding the interior of the air-bag proper with the atmospheric pressure. The air-bag proper 3 is formed with so-called "air draining openings" 3'.

When, in operation, a vehicle deceleration sensor (not shown) senses a vehicle collision, the inflator 4 operates to inflate the air-bag proper 3. As has been mentioned hereinafore and as is seen from the graph of FIG. 11, just after operation of the inflator 4, the internal pressure of the air-bag proper 3 is rapidly increased as indicated by the curve "C" and thereafter, due to the inertia of the expanding air-bag proper 3, the internal pressure is greatly reduced to a negative degree as indicated by the portion "D". However in the second embodiment, when the internal pressure becomes negative, the reed members 28 open the corresponding openings 26 feeding the atmospheric air into the air-bag proper 3, as is seen from FIG. 9. Accordingly, the rapid reduction in the internal pressure caused by the inertia of the expanding air-bag proper 3 is lessened as is seen from the broken curved line "b" of FIG. 11. Due to the air feeding into the air-bag proper 3, the speed of a pressure-raising occuring thereafter is high as compared with a case wherein the air-induction structure is not provided. This phenomenon is greatly advantageous because of the following reasons.

When the vehicle collision takes place on a vehicle which has run at a high speed, the forward inclination of the seat occupant occurs rapidly. Thus, if the above-mentioned pressure-raising fails to be done rapidly, it tends to occur that the seat occupant hits his or her head against the steering wheel 2 due to insufficient inflation of the air-bag proper 3. In the second embodiment, this phenomenon does not occur because of the rapid pressure-raising.

Figure 10:
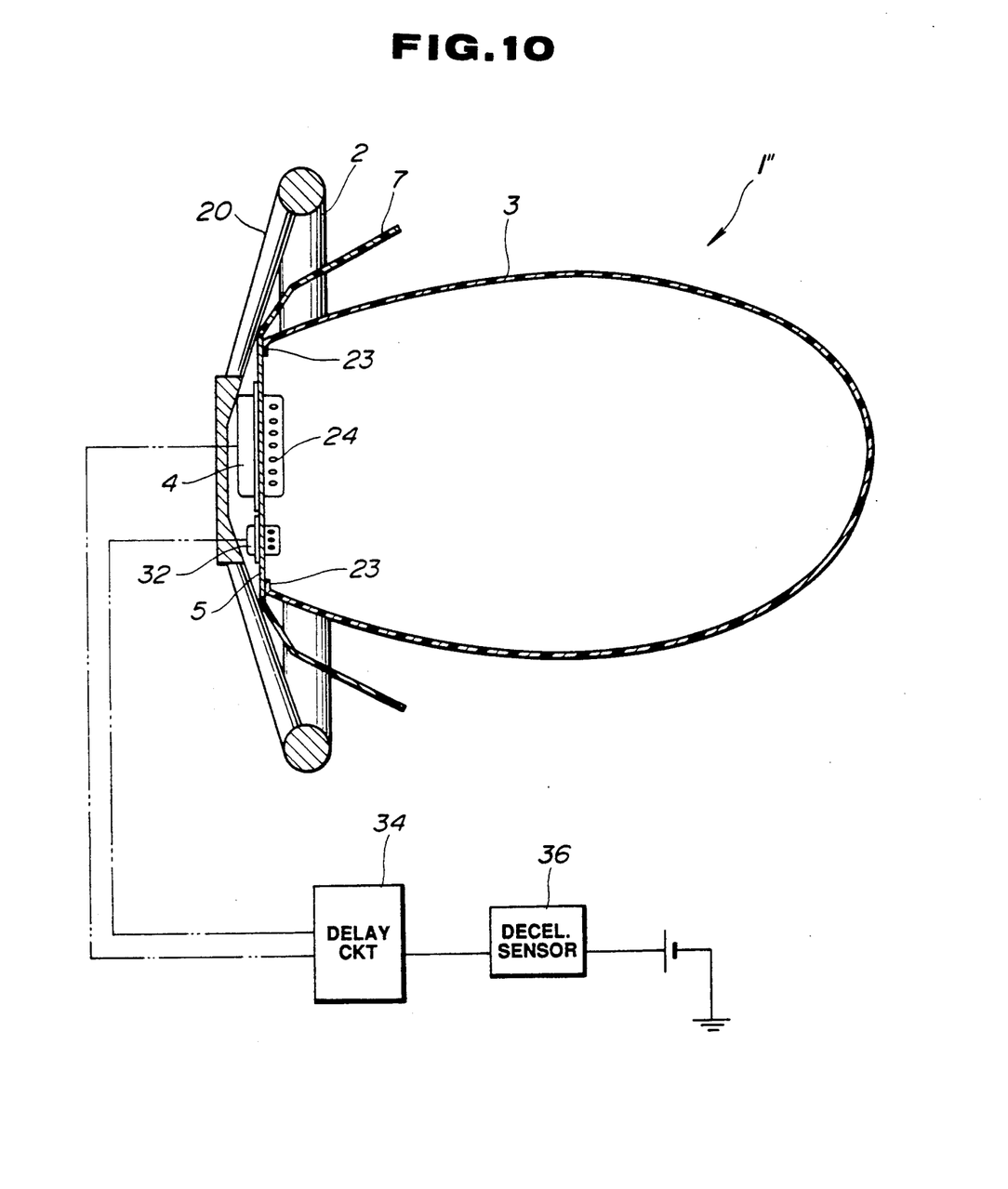
FIG. 10 is a view similar to FIG. 9, but showing an air-bag device which constitutes part of an air-bag system of a third embodiment of the present invention.

Referring to FIG. 10, there is shown an air-bag system 1" of a third embodiment of the present invention.

The air-bag system 1" of the third embodiment comprises a base plate 5, a breakable container 7 and an air-bag proper 3 which are arranged on a steering wheel 2 in the same manner as the afore-mentioned first embodiment 1'.

In the third embodiment, primary and secondary inflators 4 and 32 are employed, which are mounted to the base plate 5. The sum of the gas discharging capacities of the primary and secondary inflators 4 and 32 is substantially the same as the capacity of the inflator 4 of the second embodiment 1'. The two inflators 4 and 32 are electrically connected to a delay circuit 34 which is in turn connected to a vehicle deceleration sensor 36 (viz., vehicle collision sensor).

When, in operation, the vehicle deceleration sensor 36 detects a vehicle collision, the delay circuit 34 issues a signal to the primary inflator 4 and a delayed signal to the secondary inflator 32. With this, at first, the primary inflator 4 is operated to instantly inflate the air-bag proper 3. Thus, the internal pressure of the air-bag proper 3 is rapidly increased and then rapidly reduced for the reason as has been described hereinabove. Upon the rapid reduction in the internal pressure, the secondary inflator 32 is operated to feed the interior of the air-bag proper 3 with additional gas.

Figure 11:
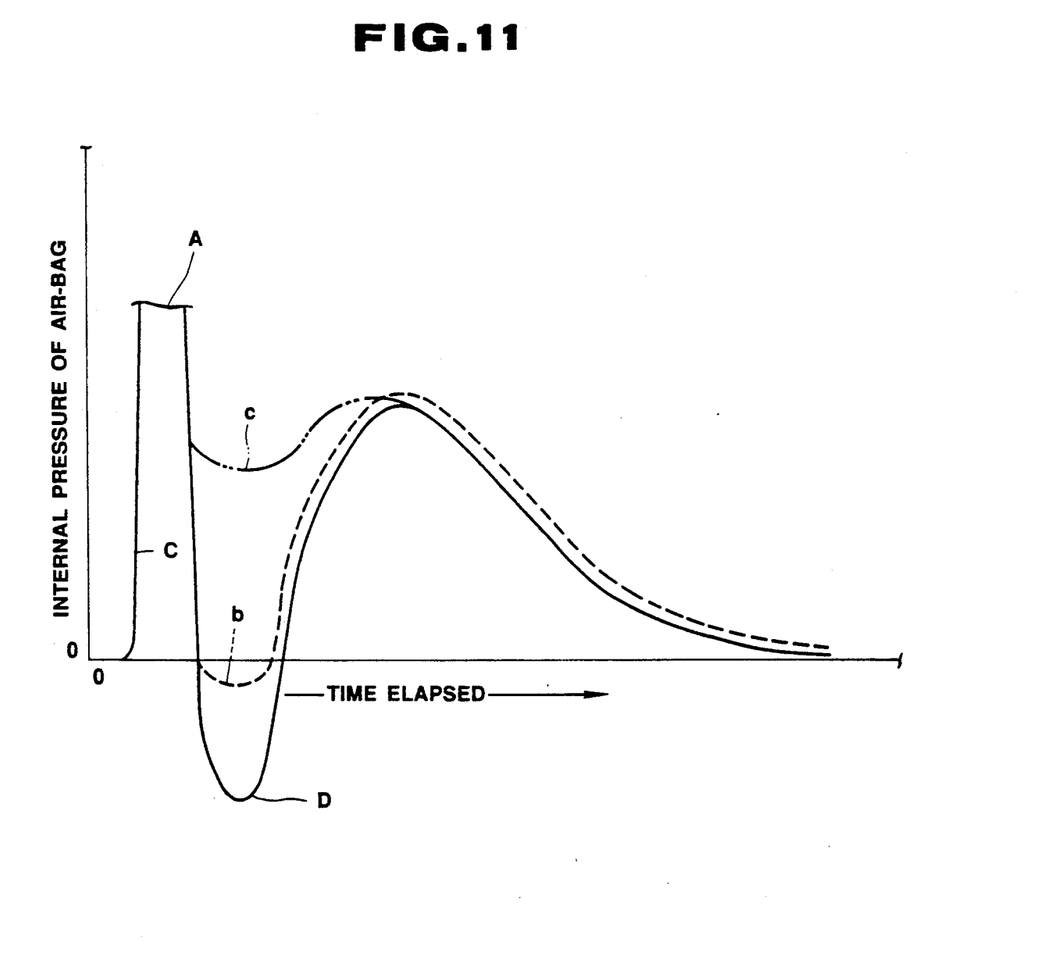
FIG. 11 is a graph similar to that of FIG. 7, but showing the characteristic of the second and third embodiments.

Accordingly, the rapid reduction in the internal pressure caused by the intertia of the expanding air-bag proper 3 is lessened as is seen from the phantom curved line "c" of FIG. 11. Thus, the same advantage as the second embodiment 1' is also given in the third embodiment 1".

The foregoing three embodiments are merely illustrative of the principle of my invention. Further, numerous modification can be made as will be recognized by those skilled in the art within the scope of my invention. Accordingly, it is not desired to limit my invention to the exact construction as illustrated and described herein.

What is claimed is:

1. An air-bag system in a motor vehicle, comprising:
   a container;
   an expandable air-bag proper contained in said container, said container being broken upon inflation of said air-bag proper;
   inflator means for inflating said air-bag proper upon electric energization thereof in response to an application of an abnormal shock to the vehicle, wherein upon inflation of said air-bag proper by said inflator means, the pressure in said air-bag proper being immediately reduced due to the force of inertia of the expanding air-bag proper; and
   pressure control means for controlling the pressure in said air-bag proper after the sudden pressure reduction to retain the pressure in said air-bag proper at a predetermined level to control the pressure in the air-bag proper after sudden increase of the pressure in the air-bag proper caused by an occupant colliding said air-bag proper to reduce impact to said occupant,
   wherein said pressure control means includes:
      a first relief valve for communicating the interior of said air-bag proper with the atmosphere when the internal pressure of said air-bag proper reaches a first given pressure;
      a second relief valve for communicating the interior of said air-bag proper with the atmosphere when the internal pressure of said air-bag proper reaches a second given pressure, said second given pressure being higher than said first given pressure;
      sensor means for issuing information signals representative of the condition of the vehicle at the time when a vehicle collision occurs; and
      a control unit for controlling the characteristics of said first and second relief valves in accordance with the information signal from said sensor means.

2. An air-bag system according to claim 1, further comprising:
   a vehicle deceleration sensor for issuing a signal representative of said vehicle collision; and
   wherein said sensor means comprises:
      a load sensor for issuing a signal representative of the weight of an occupant on a seat;
      a vehicle speed sensor for issuing a signal representative of the speed of the motor vehicle;
      a seatbelt sensor for issuing a signal representative whether a seatbelt is engaged; and
      an atmospheric pressure sensor for issuing a signal representative of the atmospheric pressure.

3. An air-bag system according to claim 2, wherein said control unit comprises a microprocessor to which the information signals from said load sensor, said vehicle speed sensor, seatbelt sensor, said atmospheric sensor, said vehicle deceleration sensor, and said pressure control means are applied.

4. An air-bag system according to claim 3, wherein said microprocessor calculates a collision speed of a seatbelt-restrained occupant against the inflated air-bag proper based on a speed of the motor vehicle at which the vehicle collision occurs when said seatbelt sensor issues a signal representing that said seatbelt is engaged, said air-bag collision speed being lower than said motor vehicle collision speed.

5. An air-bag system according to claim 3, wherein said microprocessor calculates a collision speed of a non-seatbelt-restrained occupant against the inflated air-bag proper based on a speed of the motor vehicle at which the vehicle collision occurs when said seatbelt sensor issues a signal representing that said seatbelt is not engaged, said air-bag collision speed being substantially equal to said motor vehicle collision speed.

6. An air-bag system in a vehicle, comprising:
   a breakable container;
   an expandable air-bag proper contained in said container;
   inflator means for inflating said air-bag proper upon electric energization thereof in response to a vehicle collision; and
   pressure control means for relieving pressure in said air-bag proper just after a sudden increase in the pressure caused by said inflator means and for relieving pressure in the air-bag proper after further sudden increase of the pressure in the air-bag proper caused by an occupant colliding said air-bag proper to reduce impact to said occupant, said pressure control means comprising:
      a first relief valve for releasing pressure in said air-bag proper to the atmosphere when the internal pressure of said air-bag proper reaches a first given pressure;
      a second relief valve for further releasing pressure in said air-bag proper to the atmosphere when the internal pressure of said air-bag proper reaches a second given pressure, said second given pressure being higher than said first given pressure;
      sensor means for issuing information signals representative of the condition of the vehicle at the time of a vehicle collision; and
      a control unit for controlling said first and second relief valves in accordance with said information signals from said sensor means.

7. An air-bag system according to claim 6, further comprising:
   a vehicle deceleration sensor for issuing a signal representative of said vehicle collision; and
   wherein said sensor means comprises:
      a load sensor for issuing a signal representative of the weight of a occupant on a seat;

a vehicle speed sensor for issuing a signal representative of the speed of the motor vehicle;

a seatbelt sensor for issuing a signal representative whether a seatbelt is engaged; and an atmospheric pressure sensor for issuing a signal representative of the atmospheric pressure.

8. An air-bag system according to claim 7, wherein said control unit comprises a microprocessor to which the information signals from said load sensor, said vehicle speed sensor, said seatbelt sensor, said atmospheric pressure sensor and said pressure control means for controlling said first and second relief valves, and said vehicle deceleration sensor for activating said inflator means are applied.

9. An air-bag system according to claim 8, wherein when said seatbelt sensor issues a signal indicative of said seatbelt being engaged, said microprocessor calculates a collision speed of a seatbelt-restrained occupant against the inflated air-bag proper based on a speed of the motor vehicle at which the vehicle collision occurs, said air-bag collision speed being lower than said motor vehicle collision speed.

10. An air-bag system according to claim 8, wherein when said seatbelt sensor issues a signal indicative of the seatbelt being not engaged, said microprocessor calculates a collision speed of a non-seatbelt-restrained occupant against the inflated air-bag proper based on a speed of the motor vehicle at which the vehicle collision occurs, said air-bag collision speed being substantially equal to said motor vehicle collision speed.

* * * * *